United States Patent [19]

Barke et al.

[11] 4,272,417

[45] Jun. 9, 1981

[54] STABLE PROTECTIVE SEED COATING

[75] Inventors: Martin B. Barke; Rebecca A. Luebke, both of Minneapolis, Minn.

[73] Assignee: Cargill, Incorporated, Minnetonka, Minn.

[21] Appl. No.: 41,321

[22] Filed: May 22, 1979

[51] Int. Cl.³ .................... A01C 1/06; A09D 3/64; C09D 5/02; A09D 5/14
[52] U.S. Cl. .................... 260/22 R; 47/57.6; 47/DIG. 9; 47/DIG. 11; 260/22 TN; 260/29.2 R; 260/29.2 E; 260/29.6 E; 260/33.4 R; 260/33.44 R; 260/DIG. 43
[58] Field of Search ......... 47/57.6, DIG. 9, DIG. 11; 260/DIG. 43, 22 TN, 33.4 R, 33.4 UR, 22 R, 29.2 E, 29.2 R, 29.6 E

[56] References Cited

U.S. PATENT DOCUMENTS

| | | | |
|---|---|---|---|
| 2,081,667 | 5/1937 | Heyl | 47/DIG. 9 |
| 2,967,376 | 1/1961 | Scott | 47/57.6 |
| 3,089,280 | 5/1963 | Klaas | 47/DIG. 11 |
| 3,113,399 | 12/1963 | Eversole et al. | 47/DIG. 11 |
| 3,157,964 | 11/1964 | Ferguson et al. | 47/DIG. 11 |
| 3,621,612 | 11/1971 | Porter | 47/57.6 |
| 3,707,807 | 1/1973 | Graves | 47/57.6 |
| 3,803,761 | 4/1974 | Watts et al. | 47/57.6 |
| 4,116,941 | 9/1978 | Hanson | 260/29.2 E |

FOREIGN PATENT DOCUMENTS 1287998   9/1972   United Kingdom .............. 47/DIG. 11

OTHER PUBLICATIONS

Singer, Fundamentals of Paint, Varnish, and Lacquer Technology, American Paint Journal Company, St. Louis, Mo. 1957, pp. 229-251.

*Primary Examiner*—Ronald W. Griffin
*Attorney, Agent, or Firm*—Fitch, Even, Tabin, Flannery & Welsh

[57] ABSTRACT

A stable, liquid seed coating composition is provided, including a binding agent, an active ingredient and a coloring agent in a liquid medium including water and a polyol.

12 Claims, No Drawings

STABLE PROTECTIVE SEED COATING

The present invention relates generally to the protection of seeds by the application of protective coatings. More particulary, it relates to stable, flowable liquid protective coatings for seeds and the like.

It has been known to apply various active ingredients directly to seeds for the purpose of protecting the seeds from disease, fungi, and insects, etc., and for the purpose of providing the seed with growth regulators and nutrients. Seeds coated with active ingredients, such as those disclosed in U.S. Pat. No. 3,113,399, have proven to be quite successful in terms of germination rates, etc.

In view of the fact that the active ingredients generally will not adhere directly to the seed surface, which can vary in surface texture and the degree of hydrophobic or hydrophillic character, the active ingredients are usually dispersed or dissolved in a liquid coating composition which is applied to the seed. Upon drying, the coating which includes a binding agent retains the active ingredient upon the seed.

A coloring agent, such as a dye is required by law in the seed coating so that an observer can immediately determine that the seeds are treated. The dye is also useful to indicate to the user the degree of uniformity of the coating applied.

During the course of handling, storing, dispensing and transporting coated seeds, from the time the seeds are coated until they are planted in the field, considerable amounts of friction are applied to each seed through contact with other seeds and with mechanical equipment. Such frictional contact naturally removes portions of any coating that is applied by the seed processor. In this manner substantial amounts of the composition, particularly the active ingredients, are rendered ineffective and constitute a loss.

In order to minimize losses it is desirable to apply the coatings to the seeds as close to the time and location of planting as is possible. Unfortunately, however, prior seed coating compositions have proven to be physically and/or chemically unstable and thus unsuitable for extended storage and transportation to remote locations for seed application. The instability takes many forms, such as gelling, hard settling, loss of activity, loss of resin adhesion, loss of dye strength, etc. In view of these stability problems, it has been necessary to apply the known seed coating compositions promptly after all the ingredients are combined and blended.

As a result of the friction problems, which are reduced by mixing just prior to coating, attempts have been made to provide seed coating compositions that can be mixed and applied by the farmer just prior to planting. Unfortunately, the requisite blending of ingredients has proved generally unworkable, particularly for the smaller farm operation which cannot afford the required time, equipment and trained personnel for proper measuring and mixing of the compositions to achieve optimum seed coverage. As a result, despite the losses through friction, etc., prior coatings have been essentially limited in use to seed processors, rather than individual farmers.

Accordingly, it is an object of the present invention to provide an improved seed coating composition and a method for preparing such composition. It is a more particular object of this invention to provide an improved stable liquid seed coating system which includes a binding agent, a coloring agent and an active ingredient, ready for application by the coater without further additions or blending, and which is sufficiently stable to permit long term storage, under harsh conditions, for later application to seeds.

These and other objects and advantages of the invention will become apparent by reference to the following description.

The seed coating composition of this invention includes one or more binding agents, one or more coloring agents, and one or more active ingredients within a liquid medium including water and a polyol. After preparation, the composition is stable, i.e. suitable for storage for extended periods of time, i.e. several months, and for purposes of transportation to the location of seed application without separation, hard settling of loss of activity and without the requirements of secondary additions or blending.

The active ingredient is preferably one or more of the ingredients selected from the class comprising fungicides, insecticides, rodenticides, herbicides, bird repellants, nematocides, miticides, growth regulants and nutrients. Particular active ingredients which can be used include Vitavax, a carboxin, methoxychlor, Warfarin, 2, 4-D, mesurol, molybdium, TBZ, 3-indolebutyric acid, malathion, anthraquinone, ammonium nitrate, and tetramethylthuiram disulfide.

The amount of active ingredient included in the composition depends upon the desired effect and potency of the particular ingredient and may range between a few parts-per-million and about 40% of the entire composition on a weight basis.

The binding agent for the seed coating composition comprises a nonphytotoxic water-borne resin which is either water soluble, water reducible or water dispersable depending upon the cultural practices and environmental conditions. The resins are selected from the classes comprising thermoplastic or thermosetting, water-borne resin systems. Particular resins which can be used include vinyl acrylic emulsions, partially hydrolized copolymers of vinyl chloride and vinyl acetate, drying oil modified polyurethanes, vinyl toluene copolymer modified drying oil, 23 percent penta soya oil alkyds, pinene polymer type hydrocarbon resins, chain stopped alkyds, water reducible alkyds, chlorinated rubber, epoxy esters, acrylics, polyvinyl acetate, polyvinyl alcohol, styrenated alkyd, latex, modified polyacrylamides, self-curing carboxylated styrene butadiene latex, poly (methyl vinyl ether/maleic anhydride), vinyl pyrrolidone/dimethylamino ethylmethacrylate copolymer, and vinyl pyrrolidone/vinyl acetate copolymer. The preferred resins are polyvinyl acetate copolymers.

The resin preferably comprises at least about 2.5 percent of the total composition on a weight basis. However, the determining factor is whether there is a sufficient amount of resin to retain an effective amount of the active ingredient upon the seed. The amount will vary with the type and amount of active ingredient and the type of seed. Some seeds are particularly smooth or waxy and require greater amounts of resin for adherance.

The coloring agents are selected from the class comprising dyes, pigments, and lakes. Particular coloring agents which can be used include methyl violet 4PBX, Direct Red 81, Fuchsine RTN New Powder, Acid Red 73, Rhodamine B-500, Calco oil yellow EM, Calcocid Tartrazine Double Conc, Calcocid Green SG, Red Lake C, Calcocid Blue 2G, Tint-Ayd Pern., Organic Scarlet, Tenneco 895-000-72 Phthalo Blue Aqueous Industrial Colorant, Tenneco 895-000-0401 Quinacridone Red Aqueous Industrial Colorant.

The coloring agent is selected for solubility and/or dispersability in the liquid system and color intensity required for particular seed surfaces, and may comprise between about 0.1 percent and about 3 percent of the total composition, but is preferably about 0.4 percent of the total composition on a weight basis.

The liquid medium includes water and a polyol in an amount comprising about 5 percent to about 48 percent of the total composition on a weight basis. Ethylene glycol, hexylene glycol, propylene glycol, diethylene glycol, glycerol, methylcellosolve and butyl cellosolve have all been found to be satisfactory polyols for use in accordance with the present invention.

In a preferred embodiment, a suspending agent, such as attapulgite clay, Methocel, Attagel or Cab-O-Sil, is added to the composition in an amount comprising between 0.3 percent to about 2.0 percent of the total composition on a weight basis. The suspending agent provides a preferable viscosity of 40-90 Ku and a flow rate of 20-60 seconds in a #4 Ford cup.

The coating composition resulting from mixing and blending a resin, coloring agent and active ingredient in a liquid medium, including water and a polyol in the described proportions, is ready for use immediately and remains in this condition for extended periods of time, i.e., up to 60 days, and after harsh conditions such as five freeze-thaw cycles. No further additions of liquid, dyes, resins or active ingredients are required prior to application to seeds by standard seed coating equipment. Formulations in accordance with the present invention were tested after application to seeds and found to be as safe and effective as prior EPA registered products. The germination rates were substantially identical as those of the earlier commercially available products.

The following examples will generally illustrate particular ways of practicing this invention.

EXAMPLE 1

A coating composition in accordance with this invention was prepared by agitating 30 lbs. of water while adding 0.69 lbs. of an ammonium salt of sulfated nonylphenoxypoly (ethyleneoxy) ethanol, sold under the trade name Alipal CO-436. One pound of an attapulgite clay, sold under the trade name Attagel 40, was added to the preceding mixture. Then 10.15 lbs. of a fungicide, a carboxin that is sold under the trade name Vitavax 99%, was added. Then 10.15 lbs. of a fungicide, tetramethylthuiran disulfide, sold under the trade name Thiram, was added. The ingredients were blended using standard pigment dispersing techniques common to the paint industry.

Then 3.0 lbs. of water and 21 lbs. of a vinyl acrylic emulsion, sold under the trade name Wallpol 40-136, were added and mixed until dispersed. Then 23.0 lbs. of ethylene glycol, 0.001 lbs. of Nopco NDW defoamer, and 0.40 lbs. of Fuchsine were added and mixed until dispersed. Following dispersion of the dye, 0.388 lb. of methanol was added and the mixture was blended until it was uniform.

Samples stored for about two weeks at 120° F. and at room temperature exhibited no gelling, no hard settling, no loss of active ingredient strength, no loss or resin properties (such as drying time and adhesion), no loss of colorant strength, nor changes in colorant shade. No loss of coating uniformity was noted when the aged room-temperature and elevated-temperature samples were applied to seed. The aged samples exhibited no loss of pencil hardness or adhesion quality when films were cast on glass. The coloring agent color and strength remained constant when analyzed spectrophotometrically. No bridging was noted in seed coated with samples.

EXAMPLE 2

First 60 g of a modified polyacrylamide, sold under the trade name Cyanamer A-370, was dispersed in 253.3 g of water. Then 30 g of a 5 percent aqueous solution of a clay mineral gellant and 28.0 g of a premix consisting of 31.25 percent water, 6.25 percent polysorbate 20, and 62.50 percent of the herbicide known as 2,4 dichlorophenoxyacetic acid were added. Then 125.0 g of ethylene glycol, 2.0 g of Calcozine Fuchsine New Powder, and 1.70 g of methyl alcohol were added sequentially and the resulting material was mixed until uniform.

Corn, treated by agitating 1 g. of the above mixture with ¼ lb. of seed in a closed 16 oz. glass jar, was uniformly coated and dried quickly without any bridging of the seeds. A 0.003 inch film cast on glass yielded a 2B pencil hardness after 24 hours of air drying at room temperature. Storage of the mixture for two weeks at 120° F. resulted in no loss of colorant strength, resin properties or active ingredient qualities.

EXAMPLE 3

The following ingredients were added sequentially under agitation: 212.9 g water, 50.0 g of a sodium salt of a carboxylated polyelectrolyte, sold under the trade name Daxad 30, 0.10 g of 3-indolebutyric acid, 30.0 g of a 5 percent aqueous solution of a clay mineral gellant, 100.0 g of ethylene glycol, 150 g of a self-curing carboxylated styrene butadiene latex, sold under the trade name Amsco Res 4150, 5.0 g of methocel, 10.0 g of polysorbate-20, sold under the trade name Tween-20, and 20.0 g of a colorant sold as Vat Pink FFD Paste. Agitation was continued until the mixture appeared to be uniformly colored, the 10.0 g of methyl alcohol was added and mixed until uniformly dispersed.

Field corn and sorghum were each hand-shaken in a glass jar at a rate of 4 g. of coating per pound of seed. The seed was uniformly coated, dried rapidly, and displayed no serious bridging tendencies. Films cast from samples of the mixture, which were aged at both room temperature and 120° F. for two weeks, compared favorably to films cast from freshly compounded product, both as to pencil hardness and adhesion. Storage for two weeks at room temperature and 120° F. produced no loss of colorant, active ingredient, no hard settling, nor other changes which would render the product less effective in use.

EXAMPLE 4

A mixture of 120.0 g. of a 5% aqueous solution of a clay mineral gellant, 100.0 g. water, 9.6 g. of a carboxylated polyelectrolyte sold under the tradename Daxad 30, 0.8 g. of a defoamer sold under the tradename Foamkill 649, 51.5 g. of a fungicide sold under the tradename Vitavax, and 101.5 g. of tetramethylthiuram disulfide was blended using standard pigment dispersing techniques common to the paint industry. The 298.3 g. of water was added to a premix of 11.2 g. 28% ammonium hydroxide, 5.3 g. n-butanol and 144.4 g. of a water reducible alkyd sold under the tradename Cargill 7407, and the blend was added to the initial dispersed phase.

Then 150.0 hexylane glycol, 3.7 g. Rhodamine B colorant, 0.3 g. Methyl Violet 4BPX colorant, and 3.4 g. methyl alcohol were added and mixing continued until the product was uniform. Storage of the mixture at 120° F. for thirty days and subjecting it to five complete freeze-thaw cycles caused no hard settling, no loss of colorant strength, no loss of resin properties nor loss of active ingredient qualities.

EXAMPLE 5

A mixture of 60.0 g. of a 5% aqueous solution of a clay mineral gellant, 163.0 g. water, 9.6 g. of a carboxylated polyelectrolyte sold under the tradename Daxad 30, 0.8 g. of a defoamer sold under the tradename Foamkill 649, 51.5 g. of a fungicide sold under the tradename Vitavax, and 101.5 g. of tetrametylthiuram disulfide was blended using standard pigment dispersing techniques. Then 245.7 g. water, 150.0 g. glycerol, 210.0 of a vinyl acrylic emulsion sold under the tradename Wallpol 40-136, 0.5 g. defoamer, 3.7 g. Rhodamine B colorant, 0.3 g. Methyl Violet 4BPX colorant, and 3.4 g. methyl alcohol were added in order and blended until uniform.

The resulting coating composition performed similarly to the composition of Example 4.

EXAMPLE 6

The mixture of 60.0 g. of a 5% aqueous solution of a clay mineral gellant, 163.0 g. water, 9.6 g. of a carboxylate polyelectrolyte sold under the tradename Daxad 30, 0.8 g. of a defoamer sold under the tradename Foamkill 649, 51.5 g. of a fungicide sold under the tradename Vitavax, and 101.5 g. of tetramethylthiuram disulfide was blended using standard pigment dispersing techniques common to the paint industry. Then 138.2 g. water, 255.0 g. diethylene glycol, 210.0 g. of a self-curing carboxylated styrenebutadiene latex sold as Amsco Res 4150, 0.5 g. defoamer, 2.5 g. of an octylphenoxy polyethoxyethanol sold under the tradename Triton X-100, 3.7 g. Rhodamine B colorant, 0.3 g. Methyl Violet 4BPX colorant, and 3.4 g. of methanol were added and blended until the product was uniform.

The resulting coating composition performed similarly to the composition of Example 4.

EXAMPLE 7

A mixture of 60.0 g. of a 5% aqueous solution of a clay mineral gellant, 76.2 g. water, 100.0 g. hexylene glycol, 9.6 g. of a carboxylated polyelectrolyte sold under the tradename Daxad 30, 0.8 g. of a defoamer sold under the tradename Foamkill 649, 51.5 g. of a fungicide sold under the tradename Vitavax, and 101.5 g. of tetramethylthiuran was blended using pigment dispersing techniques common to the paint industry. Then 380.0 g. hexylene glycol, 210.0 g. of a self-curing carboxylated styrene-butadiene latex sold as Amesco Res 4150, 2.5 g. of an octyphenoxy polyethoxyethanol sold as Triton X-100, 0.5 g. defoamer, 3.7 g. Rhodamine B colorant, 0.3 g. Methyl Violet 4BPX colorant, and 3.4 g. methanol were added and blended until uniform.

The resulting coating composition performed similarly to the composition of Example 4.

EXAMPLE 8

A mixture of 6.0 g. of a 5% aqueous solution of a clay mineral gellant, 163.0 water, 9.6 g. of a carboxylated polyelectrolyte sold as Daxad 30, 0.8 g. of a defoamer sold as Foamkill 649, 51.5 g. of a fungicide sold under the tradename Vitavax and 101.5 g. tetramethylthiuram disulfide was blended using pigment dispersing techniques common to the paint industry. Then 163.87 g. water, 150.0 g. propylene glycol, 291.83 g. of a 25.7% solution of PVP K-90 in water, 0.5 g. defoamer, 3.7 g. Rhodamine B colorant, 0.3 g. Methyl Violet 4BPX colorant, and 3.4 g. methanol were added and blended until uniform.

The resulting composition performed similarly to the composition of Example 4.

EXAMPLE 9

A mixture of 48.0 g. of a 5% aqueous solution of a clay mineral gellent, 240.0 g. water, 2.0 g. of a defoamer sold as Foamkill 649, 24.4 g. of a carboxylated polyelectrolyte sold as Daxad 30, 310.8 g. of 98.5F tetramethylthiuran disulfide, and 50.0 g. ethylene glycol was blended using pigment dispersing techniques common to the paint industry. Then 310.0 g. of a vinyl acrylic emulsion sold under the tradename Wallpol 40-136, 7.4 g. Rhodamine B colorant, 0.6 g. Methyl violet 4BPX colorant, and 6.8 g. of methanol were added and blended until uniform.

The resulting composition performed similarly to the composition of Example 4.

Sufficient examples have been set forth in the foregoing to permit one skilled in the art to practice the teachings of this invention, but it is well understood among those skilled in the art that precise formulations of many of the materials herein indicated cannot be obtained from the manufacturers and cannot be determined by known chemical analysis techniques. Nevertheless, with the teachings of this disclosure and the specific examples, one skilled in the art can provide stable coating compositions in accordance with the present invention as set forth in the following claims.

What is claimed is:

1. A stable composition for coating seeds comprising a nonphytotoxic binding agent in an amount of at least about 2.5 percent, an effective amount of an active ingredient, a coloring agent in an amount of 0.1 to 3 percent, and a liquid medium, said liquid medium including water and a polyol to stabilize said composition, wherein said polyol is selected from the group consisting of ethylene glycol, hexylene glycol, propylene glycol, diethylene glycol, glycerol, methyl cellosolve, and butyl cellosolve, said polyol comprising between about 5 percent and about 48 percent by weight of said composition.

2. A coating composition in accordance with claim 1 wherein the binding agent is selected from the class of vinyl acrylic emulsions, partially hydrolyzed copolymers of vinyl chloride and vinyl acetate, polyvinyl alcohols, polyvinyl acetates, drying oil modified polyurethanes, vinyl toluene copolymer modified drying oils, 23 percent penta soya oil alkyd, pinene polymer hydrocarbon resins, chain stopped alkyds, chlorinated rubber, epoxy esters, acrylics, modified polyacrylamides, self-curing carboxylated styrene butadiene latex, polyvinyl pyrrolidone, poly (methyl vinyl ether/maleic anhydride), vinyl pyrrolidone/dimethylamino ethylmethacrylate copolymer, and vinyl pyrrolidone/vinyl acetate copolymer.

3. A coating composition in accordance with claim 1 wherein said active ingredient is selected from the class of fungicides, insecticides, rodenticides, nematocides, bird repellants, and miticides.

4. A coating composition in accordance with claim 1 wherein said coloring agent comprises a dye, pigment, or lake.

5. A coating composition in accordance with claim 1 and including a suspending agent.

6. A coating composition in accordance with claim 1 and including a wetting agent.

7. A coating composition in accordance with claim 1 and further including a clay in an amount comprising at least 0.3 percent of said composition on a weight basis.

8. A coating composition in accordance with claim 1 wherein said polyol comprises ethylene glycol.

9. A coating composition in accordance with claim 1 wherein said polyol comprises between 18 and 25 percent of said composition on a weight basis.

10. A coating composition in accordance with claim 1 wherein said binding agent is a water-reducible alkyd.

11. A coating composition in accordance with claim 1 wherein said binding agent is a styrenated alkyd.

12. A stable composition for coating seeds comprising a nonphytotoxic binding agent, an effective amount of active ingredient, a coloring agent, a liquid medium, and a clay, said liquid medium including between about 18 and about 25 percent by weight of said composition of ethylene glycol to stabilize said composition, and said clay comprising at least about 1 percent by weight of said composition.

* * * * *